Oct. 11, 1932.  W. FAVREAU  1,881,423
DISPLAY TREE
Filed Jan. 5, 1931  2 Sheets-Sheet 2

Inventor
Walter Favreau
By his Attorneys
Austin + Dix

Patented Oct. 11, 1932

1,881,423

UNITED STATES PATENT OFFICE

WALTER FAVREAU, OF TOMPKINSVILLE, NEW YORK, ASSIGNOR, BY MESNE ASSIGNMENTS, TO DESIGN LABORATORIES, INCORPORATED, OF NEW YORK, N. Y., A CORPORATION OF NEW YORK

DISPLAY TREE

Application filed January 5, 1931. Serial No. 506,614.

The invention relates to ornamental devices and more particularly to artificial trees and the like.

An object of the invention is to provide an artificial tree which is of attractive appearance and which may be easily put up and taken down.

Another object of the invention is to provide an artificial tree which is inexpensive and which is made up of simple parts which can be packed flat and kept in a small space.

Another object of the invention is to provide a Christmas tree having provision for the placing of gifts or merchandise to be displayed thereon.

Other objects will be apparent from the following description and claims when considered with the accompanying drawings, in which Fig. 1 is a perspective of one form of tree made according to the invention;

Fig. 9 is a detail section on the line 9—9 of Fig. 1.

Figure 1:
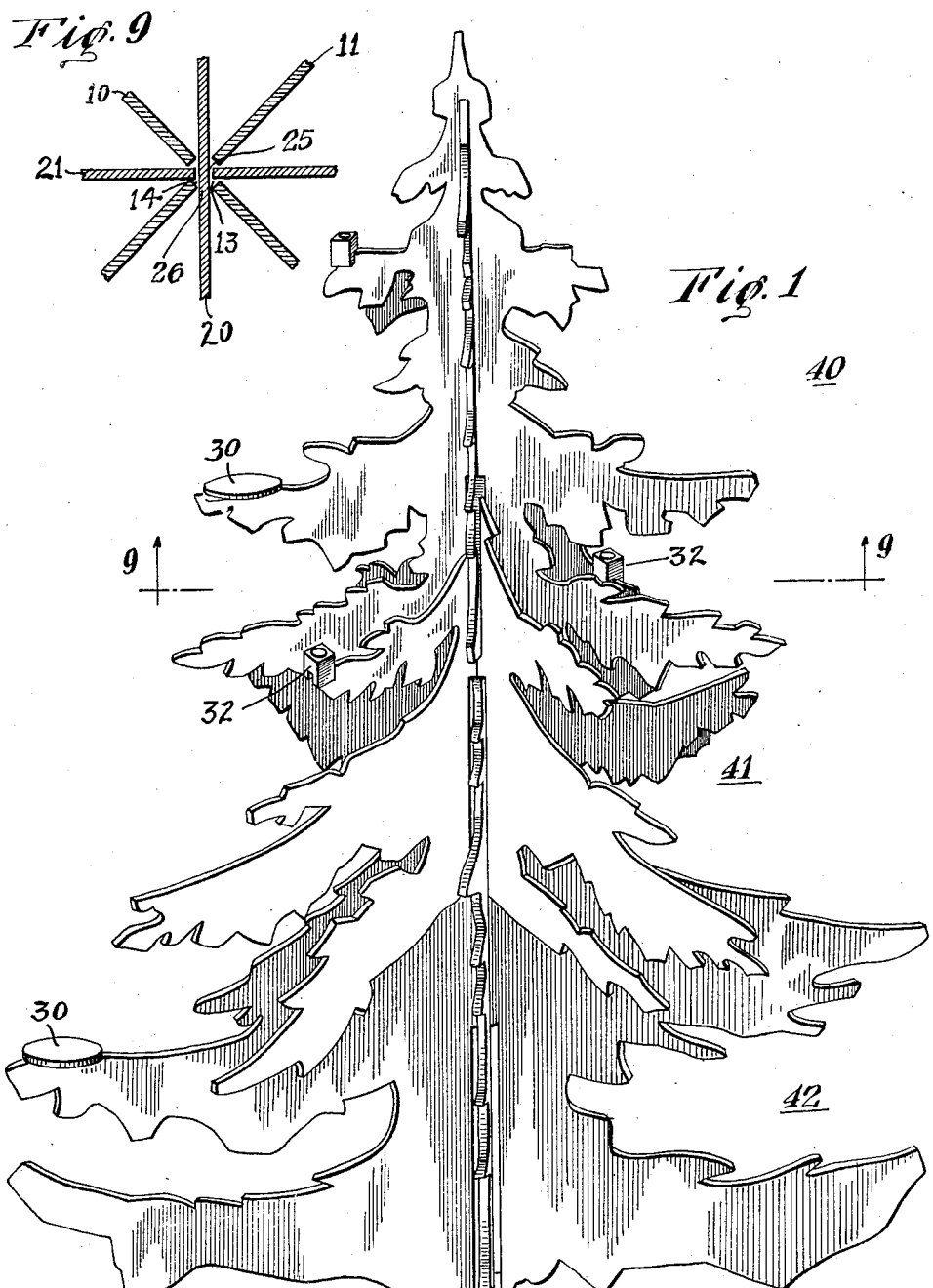
Figure 2:
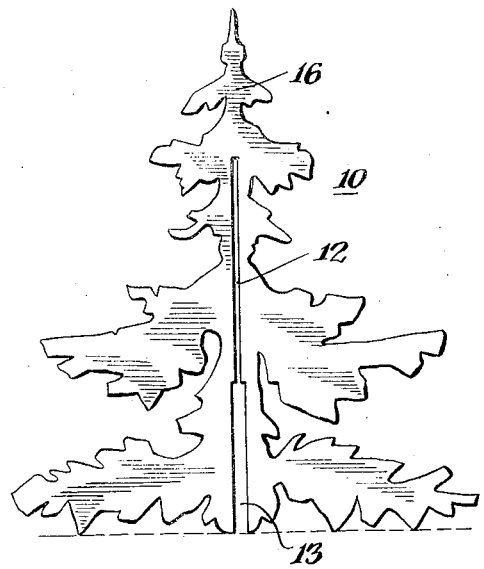
Figs. 2, 3, 4 and 5 are elevations of flat members which go to make up the tree.
Figure 3:
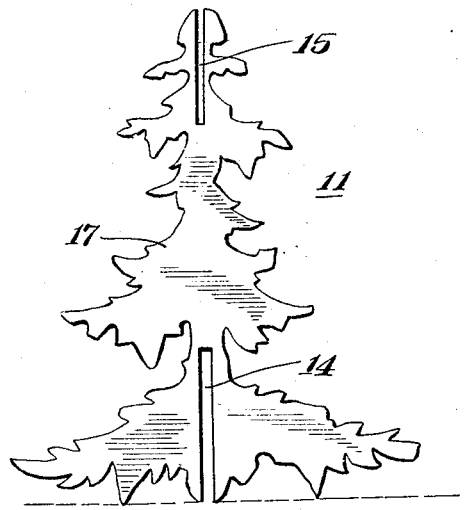
Figure 4:
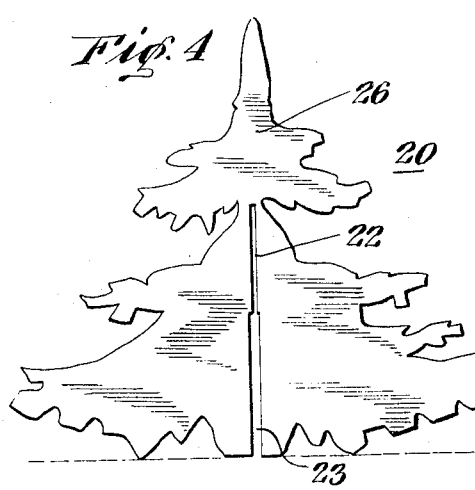
Figure 5:
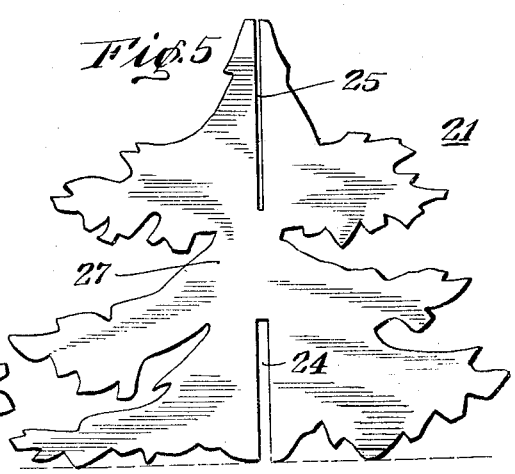

In the following description and in the claims parts will be identified by specific names for convenience, but they are intended to be as generic in their application to similar parts as the art will permit.

Like reference characters denote like parts in the several figures of the drawings.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

Referring now to the drawings and more particularly to Figs. 2 to 5, inclusive, the profile member 10 is made up of some comparatively stiff sheet material such as card board cut to the desired outline to represent the profile of the desired tree and suitably colored. It has a tip 16, a slot 12 and a larger slot 13.

The profile member 11 is similar to the profile member 10 except that it has a slot 15, a body 17 and a lower and larger slot 14.

The profile members 10 and 11 are adapted to be assembled with their planes at right angles with the tip 16 disposed in the slot 15 and the body 17 disposed in the slot 12 with the slots 13 and 14 intersecting. It will be understood that the slots 12 and 15 are of such size as to snugly fit parts therein. The profile members 10 and 11, when assembled, form a section of the tree, and in the form illustrated, the section is the top section of the tree.

The profile members 20 and 21 are similar in construction to profile members 10 and 11 except that they are preferably wider to correspond to the next lower section of the tree. Profile member 20 has a body 26, a slot 22 and a larger slot 23, while profile member 21 has slot 25, body 27 and larger slot 24.

Profiles 20 and 21 are assembled with their planes at right angles in a similar manner to profile members 10 and 11 with the body 26 disposed in slot 25 and the body 27 disposed in slot 22 with the larger slots 23 and 24 intersecting.

The bottom edges of the profile members 10, 11, 20 and 21, while serrated to appear like the outline of a tree, are laid out with their lower-most portions along a substantially straight line so that any section composed of two inter-locking profile members will rest flat on its lower edges.

After the upper section 10, 11 is assembled and the lower section 20, 21 is assembled as described above, the two sections may be assembled by sliding the profile members 20 and 21 into the intersecting slots 13 and 14, as indicated particularly in Fig. 9, to rigidly connect the upper and lower sections.

It will be understood that any number of additional lower sections may be added to the bottom, the lower sections increasing in size as they go down. Attention is called to Fig. 1 which illustrates a tree made up of three sections, indicated by 40, 41 and 42, these sections being made up of profile members in the manner described above.

If desired, a tree of one or two sections may be bought in any year and in additional years additional lower sections may be bought increasing the height of the tree year by year. It will be seen that there is but one top section and any number of lower sections, depending upon the desired height of the tree.

Figure 6:
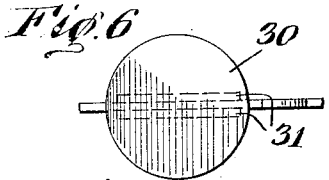
Figs. 6 and 7 are a plan view and side elevation, respectively, of a part of a tree having a small shelf mounted thereon to hold objects.
Figure 7:
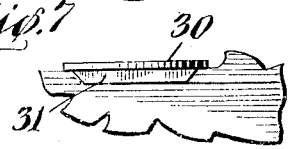

If desired, any of the branches of the profile members may be provided with shelves 30 (Figs. 6 and 7), each shelf 30 having depending flanges 31 which frictionally fit the branch or which are otherwise secured thereto, as indicated. These shelves are convenient on which to place presents, or articles of merchandise in case the tree is used as a display device.

Figure 8:
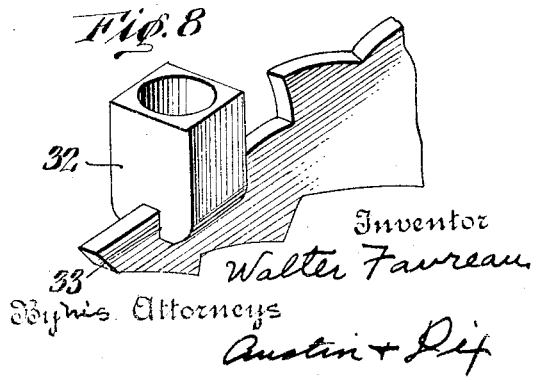
Fig. 8 is a detail illustrating a candle holder.

Similarly, in Fig. 8 candle holders 32 having grooves 33 may be suitably secured to the branches, as indicated, at the points desired.

Thus, an ornamental device has been described which is suitable for a children's Christmas tree, or suitable for a display tree of any kind for advertising purposes. It may be made very inexpensively of a relatively few pieces of card board cut to the outlines illustrated or similar outlines and the parts mutually interlocked together by the slots, as described above. No additional members are needed to hold the parts in assembled relation but the slots fit sufficiently tight to provide a substantial and rigid tree.

It will be noted that each succeeding section has its branches at 45° to its adjoining sections, thus assisting in providing a tree which is symmetrical no matter from what angle it is viewed.

While certain novel features of the invention have been shown and described and are pointed out in the annexed claims, it will be understood that various omissions, substitutions and changes may be made by those skilled in the art without departing from the spirit of the invention.

What is claimed is:

1. An artificial tree comprising a plurality of sections one above the other each section comprising a plurality of intersecting profile members and means for connecting said sections one with the other.

2. An artificial Christmas tree comprising a plurality of sections one above the other each section comprising a plurality of intersecting profile members and slotted means for interlocking said sections one with the other.

3. An artificial tree comprising a plurality of sections one above the other, each section comprising a plurality of profile members shaped to the outline of the tree, said profile members having central vertical slots, the profile members of each section having their slots mutually interlocked, the profile members of each section having additional intersecting slots to receive the intersecting profile members of the next section.

4. In an artificial tree, a first profile member having a slot, a second profile member fitting in said slot, said members forming a section, a third profile member having a slot, a fourth profile member fitting in said slot, said third and fourth members forming a second section, the intersecting members of one of said sections having intersecting slots to receive the intersecting members of the other section, whereby the profile members of one section are disposed between the profile members of the other section, said members and slots fitting tightly to hold the parts in assembled and upright position.

5. In a combination, a first member having a slot, a second member fitting in said slot, said members forming a section, a third member having a slot, a fourth member fitting in said slot, said third and fourth members forming a second section, the intersecting members of one of said sections having intersecting slots to receive the intersecting members of the other section, whereby the members of one section are disposed between the members of the other section.

6. An artificial tree comprising a plurality of superimposed tree sections, angularly displaced with respect to one another, each of said sections comprising a plurality of slotted profile members mutually interlocked by means of the slots therein.

In testimony whereof I have hereunto set my hand.

WALTER FAVREAU.